US009438836B2

(12) United States Patent
Tashiro et al.

(10) Patent No.: US 9,438,836 B2
(45) Date of Patent: Sep. 6, 2016

(54) SOLID-STATE IMAGE SENSOR AND IMAGE SENSING SYSTEM WITH DIFFERENT CHARGE ACCUMULATION PERIODS

(71) Applicant: CANON KABUSHIKI KAISHA, Tokyo (JP)

(72) Inventors: Kazuaki Tashiro, Isehara (JP); Katsuhisa Ogawa, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 35 days.

(21) Appl. No.: 14/526,782

(22) Filed: Oct. 29, 2014

(65) Prior Publication Data

US 2015/0130978 A1 May 14, 2015

(30) Foreign Application Priority Data

Nov. 12, 2013 (JP) ................................. 2013-234310

(51) Int. Cl.
*H04N 5/3745* (2011.01)
*H04N 5/353* (2011.01)
*H04N 9/04* (2006.01)

(52) U.S. Cl.
CPC ........ *H04N 5/37452* (2013.01); *H04N 5/3532* (2013.01); *H04N 5/3537* (2013.01); *H04N 9/045* (2013.01)

(58) Field of Classification Search
None
See application file for complete search history.

(56) References Cited

U.S. PATENT DOCUMENTS

| 5,159,422 | A | 10/1992 | Tashiro et al. |
| 5,366,921 | A | 11/1994 | Tashiro |
| 6,069,393 | A | 5/2000 | Hatanaka et al. |
| 6,188,094 | B1 | 2/2001 | Kochi et al. |
| 6,605,850 | B1 | 8/2003 | Kochi et al. |
| 6,670,990 | B1 | 12/2003 | Kochi et al. |
| 6,717,151 | B2 | 4/2004 | Tashiro et al. |
| 6,800,836 | B2 | 10/2004 | Hamamoto et al. |
| 6,946,637 | B2 | 9/2005 | Kochi et al. |
| 7,129,458 | B2 | 10/2006 | Hamamoto et al. |
| 2005/0151866 | A1* | 7/2005 | Ando .................... H04N 5/2355 348/297 |
| 2010/0231774 | A1 | 9/2010 | Tashiro |
| 2011/0063483 | A1* | 3/2011 | Rossi ................... H04N 5/3454 348/294 |
| 2011/0285886 | A1* | 11/2011 | Kato .................... H04N 5/3458 348/297 |
| 2012/0127337 | A1* | 5/2012 | Okada .................. H04N 5/3537 348/223.1 |
| 2013/0107087 | A1* | 5/2013 | Okada .................... H04N 5/365 348/280 |
| 2013/0208172 | A1 | 8/2013 | Tashiro et al. |
| 2014/0333814 | A1 | 11/2014 | Tashiro |

FOREIGN PATENT DOCUMENTS

JP 2008-005213 A 1/2008

* cited by examiner

*Primary Examiner* — Dennis Hogue
(74) *Attorney, Agent, or Firm* — Fitzpatrick, Cella, Harper & Scinto

(57) ABSTRACT

A solid-state image sensor has a plurality of pixels including at least a first pixel configured to detect light in a first wavelength range and a second pixel configured to detect light in a second wavelength range, the second wavelength range including a wavelength range on a longer-wavelength side than the first wavelength range. The sensor includes a control portion configured to supply a control signal to the first and second pixels such that a charge accumulation period of the first pixel is different from a charge accumulation period of the second pixel.

13 Claims, 10 Drawing Sheets

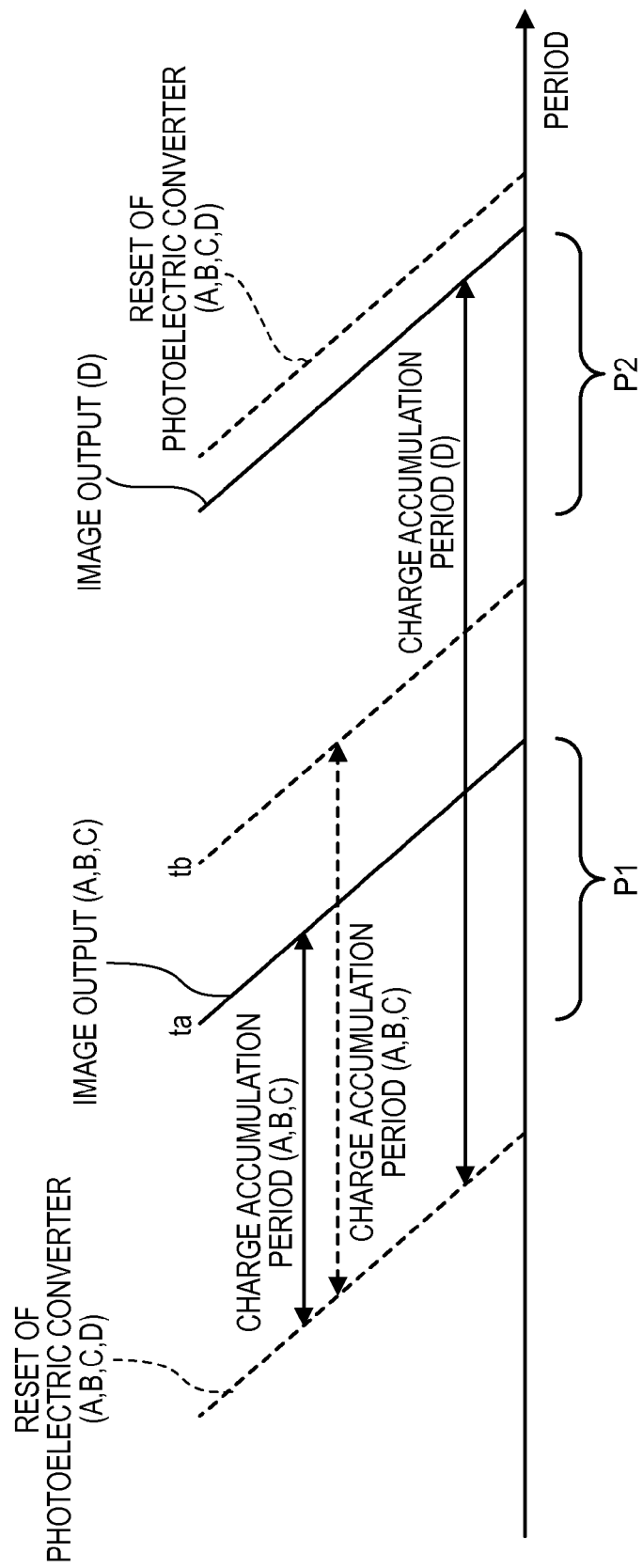

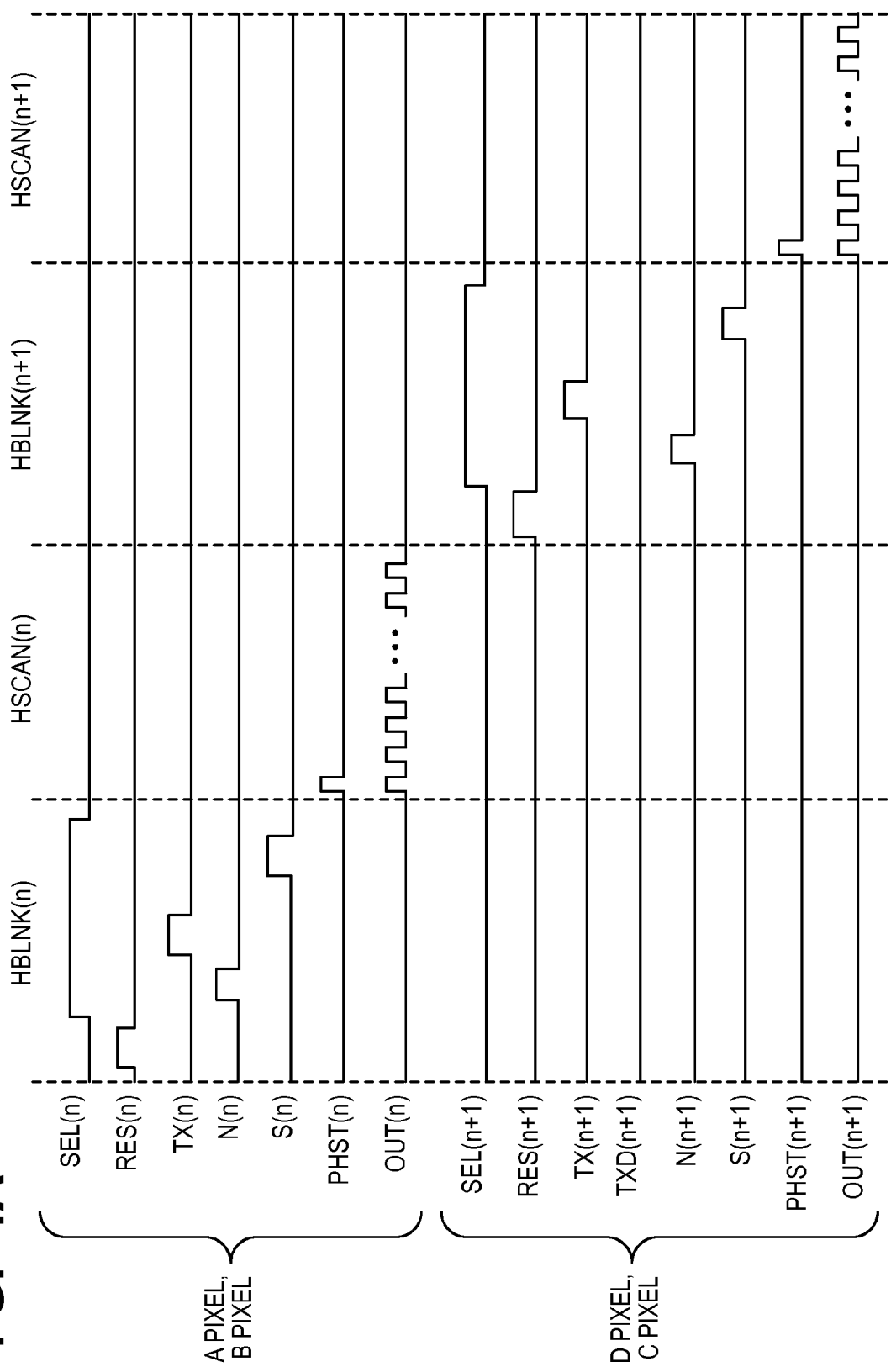

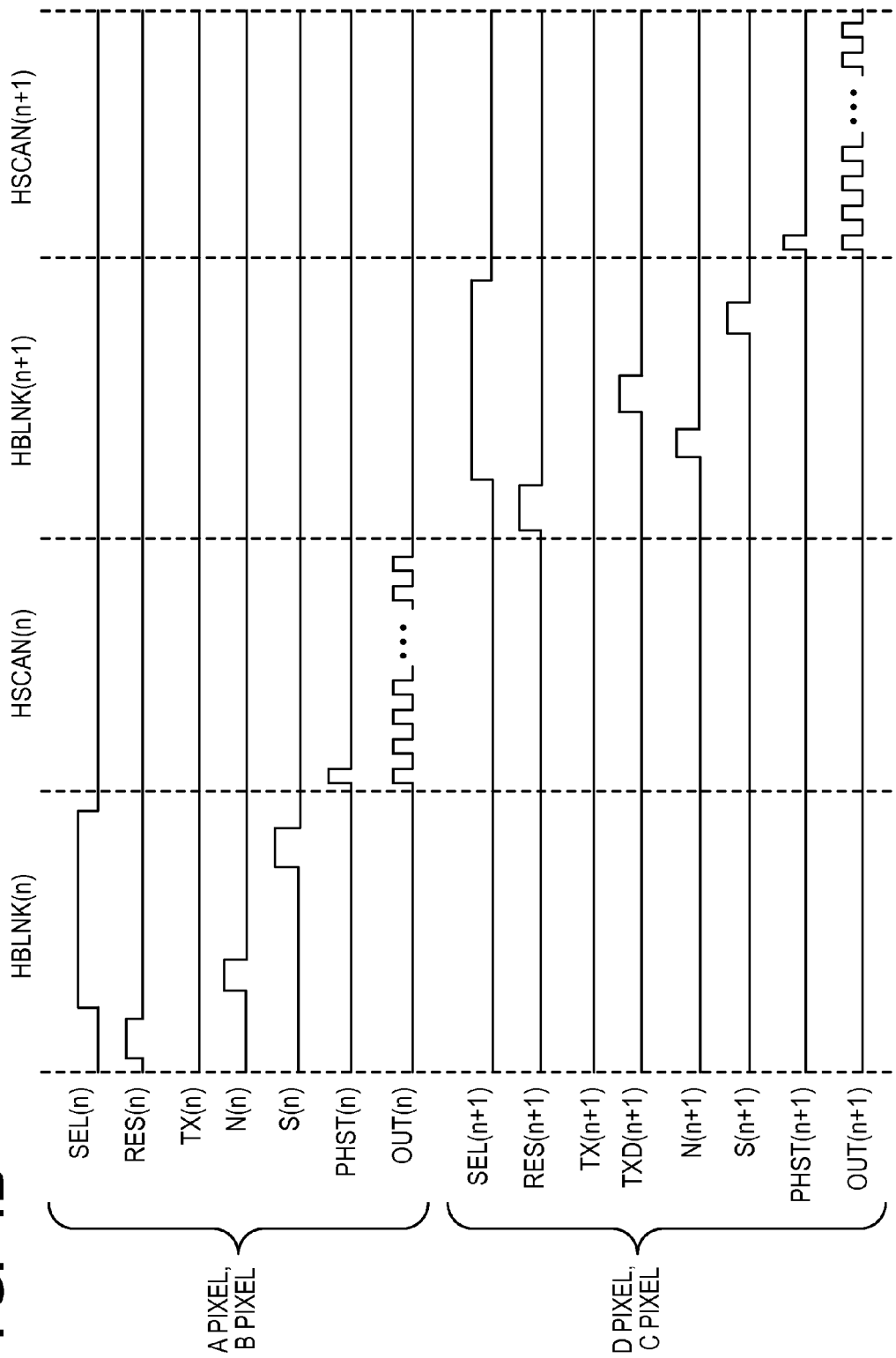

SOLID-STATE IMAGE SENSOR AND IMAGE SENSING SYSTEM WITH DIFFERENT CHARGE ACCUMULATION PERIODS

BACKGROUND OF THE INVENTION

1. Field of the Invention

The present invention relates to a solid-state image sensor and an image sensing system.

2. Description of the Related Art

In the observation of a biological body, it is necessary to monitor an image by light in a wavelength range on a short-wavelength side (to be referred to as the first wavelength range hereinafter) and an image by light in a wavelength range on a longer-wavelength side (to be referred to as the second wavelength range) than the first wavelength range at the same time. A method of performing image capturing using an image sensor for the first wavelength range and an image sensor for the second wavelength range, and superimposing the thus obtained images on each other is plausible. However, it is difficult to reduce the size and cost. It is, therefore, necessary to obtain images in two different wavelength ranges using a single image sensor.

Japanese Patent Laid-Open No. 2008-005213 discloses a CCD solid-state image sensor having a light receiving portion for a wavelength range on a short-wavelength side (to be referred to as the first light receiving portion) and a light receiving portion for a wavelength range on a long-wavelength side (to be referred to as the second light receiving portion). In this CCD solid-state image sensor, first, exposure of the first light receiving portion and the second light receiving portion (signal charge accumulation) is started at the same time. Next, after a generation portion generates a pulse, the signal charge of the second light receiving portion is swept in response to an LOD pulse, and the exposure of the second light receiving portion by a pulse reflected from an object is started. Then, all the signal charges of the first light receiving portion and the second light receiving portion are read out at once in response to a readout pulse. That is, in the solid-state image sensor described in Japanese Patent Laid-Open No. 2008-005213, the exposure period (signal charge accumulation period) of the light receiving portion for the wavelength range on the long-wavelength side is shorter than that on the short-wavelength side.

A conventional technique has relatively different sensitivities to light beams in different wavelength ranges. The CCD solid-state image sensor described in Japanese Patent Laid-Open No. 2008-005213 adds a dedicated overflow drain to independently change a pixel accumulation period. Therefore, the area of the photoelectric converter of a pixel to detect light in the wavelength range on the long-wavelength side is reduced, decreasing a sensitivity to long-wavelength light.

Furthermore, in the solid-state image sensor described in Japanese Patent Laid-Open No. 2008-005213, since the exposure period (signal charge accumulation period) of the light receiving portion for the wavelength range on the long-wavelength side is short, the detection of the long-wavelength light can be insufficient.

SUMMARY OF THE INVENTION

The present invention provides a technique advantageous in satisfactorily detecting, in a solid-state image sensor capable of detecting light in the first wavelength range and light in the second wavelength range including a wavelength range on the longer-wavelength side than the first wavelength side, light in the respective wavelength ranges.

One of aspects of the present invention provides a solid-state image sensor comprising a plurality of pixels arranged to form a matrix, the pixels including at least a first pixel configured to detect light in a first wavelength range and a second pixel configured to detect light in a second wavelength range, the second wavelength range including a wavelength range on a longer-wavelength side than the first wavelength range, wherein each of the first pixel and the second pixel includes a photoelectric converter, a floating diffusion portion, a transfer transistor configured to transfer charges from the photoelectric converter to the floating diffusion portion, and an amplifier transistor configured to output a signal corresponding to a potential of the floating diffusion portion, the first pixel and the second pixel belong to a same row, a transfer control line configured to control the transfer transistor of the first pixel and a transfer control line configured to control the transfer transistor of the second pixel are provided independently, and the solid state image sensor comprises a control portion configured to supply a control signal to the transfer transistor such that a charge accumulation period of the first pixel is different from a charge accumulation period of the second pixel.

Further features of the present invention will become apparent from the following description of exemplary embodiments with reference to the attached drawings.

BRIEF DESCRIPTION OF THE DRAWINGS

FIG. 3 is a timing chart showing a readout sequence in the solid-state image sensor according to the first embodiment;

FIG. 4A is a chart illustrating the readout operation of an image frame in the first wavelength range in the first period of the solid-state image sensor according to the first embodiment;

FIG. 4B is a chart illustrating the readout operation of the image frame in the first wavelength range in the second period of the solid-state image sensor according to the first embodiment;

DESCRIPTION OF THE EMBODIMENTS

Some embodiments of the present invention will be described below with reference to the accompanying drawings.

(First Embodiment)

Figure 1:
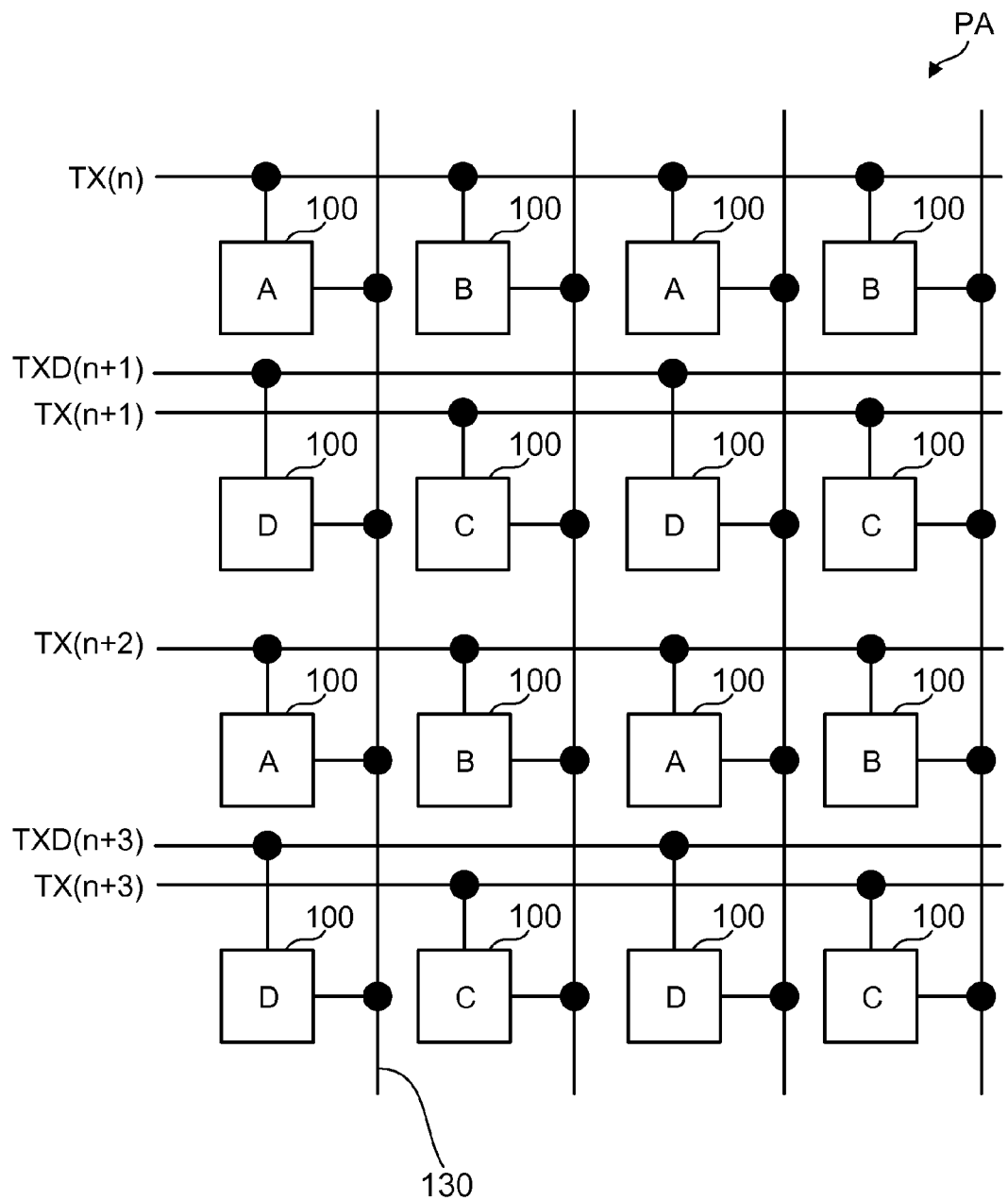
FIG. 1 is a view showing the arrangement of the pixel array of a solid-state image sensor according to the first embodiment.

FIG. 1 shows the arrangement of a pixel array PA of a solid-state image sensor 1000 according to the first embodiment of the present invention. Note that FIG. 1 shows pixels 100 arranged to form a matrix of 4 rows×4 columns for the sake of simplicity. In practice, however, a larger number of pixels 100 are arranged to form a larger number of rows and a larger number of columns. The plurality of pixels 100 of the pixel array PA include A, B, and C pixels as first pixels for detecting light in the first wavelength range, and D pixels as second pixels for detecting light in the second wavelength range including a wavelength range on a longer-wavelength side than the first wavelength range. The A, B, C, and D pixels are respectively indicated by "A", "B", "C", and "D" in FIG. 1 and other drawings. The A, B, and C pixels include color filters which transmit light in different wavelength ranges out of the first wavelength range, respectively. For example, each of the A pixels has the color filter which selectively transmits the light of a wavelength on the long-wavelength side out of the first wavelength range. Each of the B pixels has the color filter which selectively transmits the light of an intermediate wavelength out of the first wavelength range. Each of the C pixels has the color filter which selectively transmits the light of a wavelength on a short-wavelength side out of the first wavelength range. Each of the D pixels has a filter which selectively transmits light in the second wavelength range. This arrangement can reduce mixing of a light component in the second wavelength range into the signals of the A, B, and C pixels. This arrangement can also reduce mixing of a light component in the first wavelength range into the signals of the D pixels. In this embodiment, sets of the A, B, C, and D pixels are arranged to form 2×2 matrix, and the 2×2 matrix is arranged repeatedly. In another embodiment, the D pixels can be inserted, on the row basis, between the rows of the pixel array made of the A, B, and C pixels.

Figure 2:
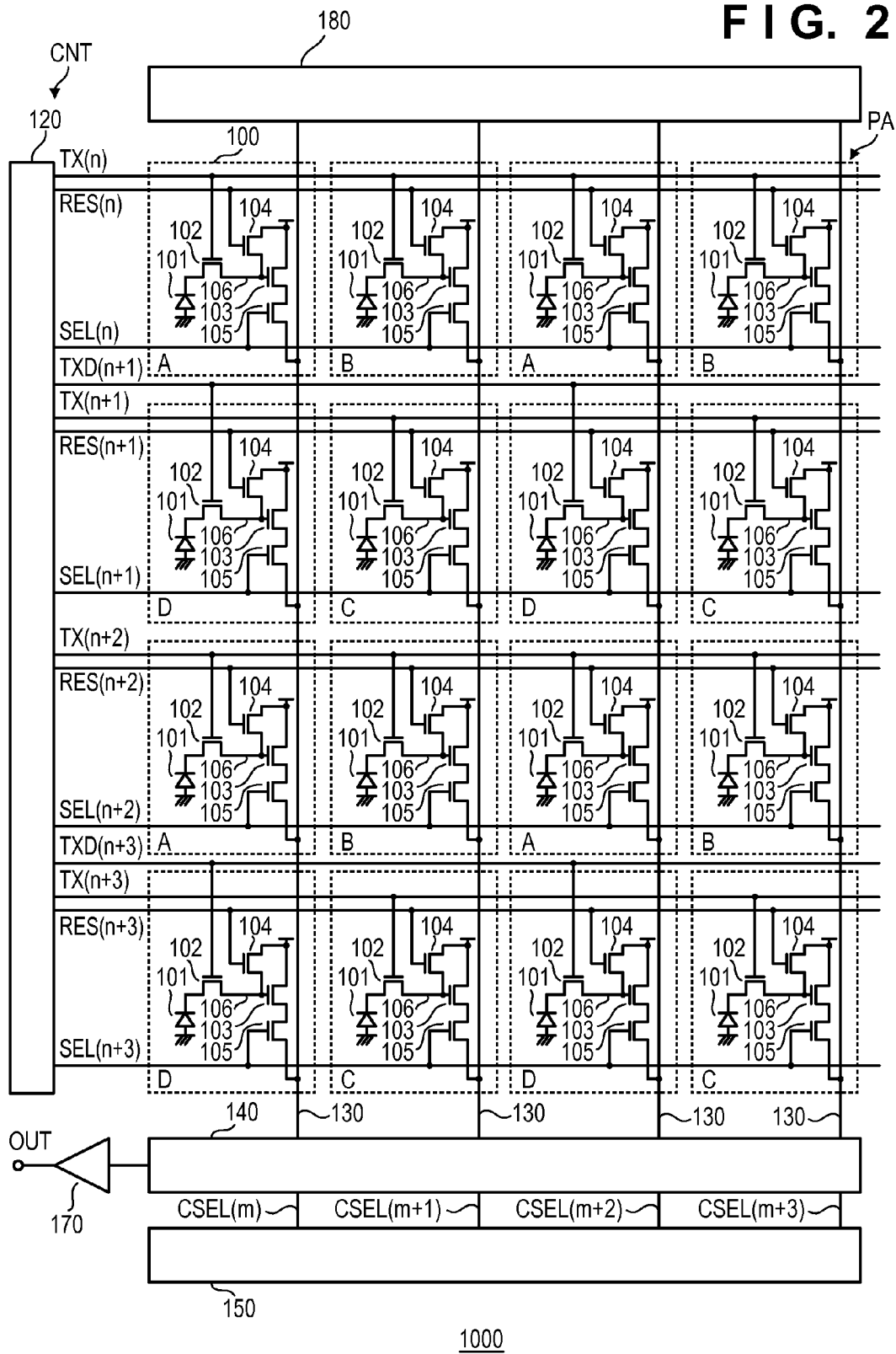
FIG. 2 is a circuit diagram showing the circuit arrangement of the solid-state image sensor according to the first embodiment.

FIG. 2 shows the circuit arrangement of the solid-state image sensor 1000 according to the first embodiment of the present invention. In FIG. 2, the same reference numerals denote the same parts in FIG. 1. The solid-state image sensor 1000 includes the pixel array PA, a vertical selecting circuit 120, a readout circuit 140, a horizontal selecting circuit 150, an output portion 170, and a load transistor array 180. In this embodiment, a driving signal output from the vertical selecting circuit 120 drives the pixels, thereby reading out the signals of the pixels. That is, in this embodiment, the vertical selecting circuit 120 is a control portion which controls the driving of the pixels.

Each pixel 100 (A, B, C, and D pixels) includes a photoelectric converter 101, a floating diffusion portion (FD portion) 106, a transfer transistor 102, and an amplifier transistor 103. Each pixel 100 may also include a reset transistor 104 and a selection transistor 105. Each photoelectric converter 101 includes, for example, a photodiode, and photoelectrically converts incident light and accumulates charges generated by the photoelectric conversion. Note that the charges generated by the photoelectric conversion may be held by each charge holding portion arranged between the photoelectric converter 101 and the FD portion 106. Each transfer transistor 102 transfers the charges accumulated in the photoelectric converter 101 to the FD portion 106. The potential of each FD portion 106 changes depending on the amount of charges transferred to the FD portion 106. Each amplifier transistor 103 forms a source follower circuit together with the load transistor of the load transistor array 180, and outputs a signal corresponding to the potential of the FD portion 106 to a corresponding column signal line 130. Each reset transistor 104 resets the potential of the FD portion 106. Each selection transistor 105 can be provided to set its pixel 100 in a selected state or an unselected state.

Each transfer transistor 102 is controlled by a corresponding transfer control line driven by the vertical selecting circuit 120. TX(n), TX(n+1), TX(n+2), and TX(n+3) are transfer control lines used for the first pixels (A, B, and C pixels). More specifically, the transfer control line TX(n) is used for the A and B pixels on the nth row. The transfer control line TX(n+1) is used for the C pixels on the (n+1)th row. The transfer control line TX(n+2) is used for the A and B pixels on the (n+2)th row. The transfer control line TX(n+3) is used for the C pixels on the (n+3)th row. The transfer control lines TXD(n+1) and TXD(n+3) denote transfer control lines used for the second pixels (D pixels). More specifically, the transfer control line TXD(n+1) is used for the D pixels on the (n+1)th row, and the transfer control line TXD(n+3), on the (n+3)th row.

Some of the plurality of first pixels (A, B, and C pixels) (some of the C pixels, in this example) and some of the plurality of second pixels (D pixels) belong to the same row. For example, some of the C pixels and some of the D pixels belong to the (n+1)th row, and some others of the C pixels and some others of the D pixels belong to the (n+3)th row. Each transfer control line which controls the transfer transistors 102 of the first pixels (the C pixels, in this example) and each transfer control line which controls the transfer transistors 102 of the second pixels (D pixels) belonging to the same row as the first pixels are controlled independently. For example, on the (n+1)th row, the transfer control line TX(n+1) which controls each transfer transistor 102 of the C pixel as the first pixel and the transfer control line TXD(n+1) which controls each transfer transistor 102 of the second pixel (D pixel) are provided independently. Furthermore, on the (n+3)th row, the transfer control line TX(n+3) which controls each transfer transistor 102 of the C pixel as the first pixel and the transfer control line TXD(n+3) which controls each transfer transistor 102 of the second pixel (D pixel) are provided independently.

In this embodiment, the plurality of pixels belonging to the same row form a pixel group so as to read out the signals to a plurality of output lines in parallel. For a specific example of an arrangement, a common control line is connected to any one of the transistors included in the pixels. In this embodiment, a common reset control line is connected to the reset transistors 104 of the plurality of pixels belonging to the same row. Also, a common selecting control line is connected to the selection transistors 105 of the plurality of pixels belonging to the same row.

Each reset transistor 104 is controlled by a corresponding reset control line driven by the vertical selecting circuit 120. RES(n) is a reset control line on the nth row; RES(n+1), a reset control line on the (n+1)th row; RES(n+2), a reset control line on the (n+2)th row; and RES(n+3), a reset control line on the (n+3)th row.

Each selection transistor 105 is controlled by a corresponding selecting control line driven by the vertical selecting circuit 120. SEL(n) is a selecting control line on the (n) th row; SEL(n+1), a selecting control line on the (n+1)th row; SEL(n+2), a selecting control line on the (n+2)th row; and SEL(n+3), a selecting control line on the (n+3)th row.

The readout circuit 140 generates a pixel signal by processing a signal output to each column signal line 130, and outputs, to the output portion 170, the pixel signal on the column selected by the column selecting line driven by the horizontal selecting circuit 150. The output portion 170 amplifies the pixel signal from the readout circuit 140, and outputs the amplified signal. CSEL(m) is a column selecting line on the (m)th column; CSEL(m+1), a column selecting line on the (m+1)th column; CSEL(m+2), a column selecting line on the (m+2)th column; and CSEL(m+3), a column selecting line on the (m+3)th column. The output portion 170 outputs an image signal outside the solid-state image sensor by outputting a plurality of pixel signals sequentially. The image signal is a signal including the plurality of pixel signals. Image forming or outputting devices such as a display and a printer can display or output images based on the image signal.

FIG. 3 shows a readout sequence in the solid-state image sensor 1000 according to the first embodiment. The solid-state image sensor 1000 outputs an image formed by the signals of the first pixels (A, B, and C pixels) (to be referred to as an image frame in the first wavelength range hereinafter) in a first period P1 (an "image output (A, B, C)" in FIG. 3). The solid-state image sensor 1000 also outputs an image formed by the signals of the second pixels (D pixels) (to be referred to as an image frame in the second wavelength range hereinafter) in a second period P2 which is different from the first period P1 (an "image output (D)" in FIG. 3). As described above, in the first embodiment, each transfer control line used for the first pixels and that used for the second pixels belonging to the same row are independent of each other. This makes it possible to independently control the charge accumulation periods of the first pixels and the second pixels belonging to the same row.

The solid-state image sensor 1000 according to the first embodiment first resets the photoelectric converters 101 of all pixels (A, B, C, and D pixels) under a rolling shutter scheme (a scheme for sequentially scanning a plurality of rows). At this time, the first pixels (C pixels) and the second pixels (D pixels) belonging to the same row are reset at the same time. Then, the solid-state image sensor 1000 reads out the first pixels (A, B, and C pixels) under the rolling shutter scheme in the first period P1, and outputs the image formed by the signals of the first pixels (A, B, and C pixels) (the image frame in the first wavelength range). At this time, the solid-state image sensor 1000 continues charge accumulation in the second pixels (D pixels). At the completion of the charge accumulation in the second pixels (D pixels), the solid-state image sensor 1000 reads out the second pixels (D pixels) under the rolling shutter scheme, and outputs the image formed by the signals of the second pixels (D pixels) (the image frame in the second wavelength range). After that, the solid-state image sensor 1000 resets the photoelectric converters 101 of all pixels (A, B, C, and D pixels) under the rolling shutter scheme. The above operation is repeated in moving image capturing.

In the first period P1, signals corresponding to charges accumulated in the photoelectric converters 101 of the second pixels are not read out. However, signals corresponding to the potential of the reset FD portions 106 of the second pixels (to be referred to as dummy signals hereinafter) may be read out in parallel with the signals of the first pixels. That is, signals corresponding to a state in which the charges in the photoelectric converters 101 are not transferred to the FD portions 106 may be read out from the second pixels. In the second period P2, the signals of the first pixels need not be read out again. However, they may be read out as the dummy signals of the first pixels again. By adopting the arrangement to read out the dummy signals, the control line of the selection transistors can be shared. Accordingly, the number of wirings can be reduced.

As described above, in the first embodiment, the vertical selecting circuit 120 drives the transfer control lines to make the charge accumulation period of the second pixels (D pixels) longer than that of the first pixels (A, B, and C pixels). In other words, the vertical selecting circuit 120 controls transfer control signals on the transfer control lines to make the charge accumulation period of the second pixels (D pixels) longer than that of the first pixels (A, B, and C pixels). A part of the charge accumulation period of the second pixels (D pixels) overlaps that of the first pixels (A, B, and C pixels). The vertical selecting circuit 120 corresponds to the control portion. Such control allows the D pixels to detect the light in the second wavelength range sufficiently.

The charge accumulation period of the second pixels (D pixels) can be, for example, twice as long as that of the first pixels (A, B, and C pixels). In FIG. 3, the first period P1 during which the signals of the first pixels are read out is indicated by ta. However, the first period P1 may be changed at an arbitrary, for example, as indicated by tb. This makes it possible to change the ratio of the charge accumulation period of the second pixels (D pixels) and that of the first pixels (A, B, and C pixels). From another point of view, alternatively, it is possible to control the charge accumulation period of the first pixels (A, B, and C pixels) and that of the second pixels (D pixels) independently.

The readout operation of the image frame in the first wavelength range in the first period P1 will exemplarily be described with reference to FIG. 4A. FIG. 4A illustrates the timings of the readout operations (a part of the readout operation of the image frame in the first wavelength range) on the nth row and the (n+1)th row in the first period P1.

First, an operation in a horizontal blank period HBLNK (n) on the nth row will be described. First, RES(n) is set at high level, thereby turning on the reset transistors 104 on the nth row, and resetting the FD portions 106 of the A and B pixels on the nth row. Next, RES(n) is set at low level, thereby turning off the reset transistors 104. SEL(n) is then set at high level, thereby turning on the selection transistors 105 to select the pixels on the nth row.

N(n) for controlling the readout circuit 140 is set at high level, thereby holding a reset signal N corresponding to the reset level of the respective FD portions 106 of the A and B pixels on the nth row by the reset signal holding portion of the readout circuit 140. TX(n) is set at high level, thereby transferring the charges of the respective photoelectric converters 101 of the A and B pixels on the nth row to the FD portions 106. S(n) for controlling the readout circuit 140 is set at high level, thereby holding an image signal SV in the first wavelength range corresponding to a charge amount transferred to the respective FD portions 106 of the A and B pixels by the image signal holding portion of the readout circuit 140.

An operation in a horizontal scanning period HSCAN(n) on the nth row will now be described. In the horizontal scanning period HSCAN(n), PHST(n) is set at high level, thereby starting a scanning operation by the horizontal selecting circuit 150. Each time OUT(n) is set at high level, a plurality of columns on the nth row are selected sequentially, thereby outputting the signals of the pixels (A and B pixels) on the nth row sequentially via the output portion 170. The output portion 170 may be formed to output a signal obtained by amplifying a difference between the image signal SV and the reset signal N in the first wavelength range (SV-N) or a signal obtained by amplifying the image signal SV and the reset signal N in the first wavelength range. Alternatively, the readout circuit 140 can be formed to supply the difference between the image signal SV and the reset signal N in the first wavelength range (SV-N) to the output portion 170.

An operation in a horizontal blank period HBLNK(n+1) on the (n+1)th row will now be described. First, RES(n+1) is set at high level, thereby turning on the reset transistors 104 on the (n+1)th row, and resetting the respective FD portions 106 of the D and C pixels on the (n+1)th row. Next, RES(n+1) is set at low level, thereby turning off the reset transistors 104. SEL(n+1) is then set at high level, thereby turning on the selection transistors 105 to select the pixels on the (n+1)th row.

N(n+1) is set at high level, thereby holding the reset signal N corresponding to the reset level of the respective FD portions 106 of the D and C pixels on the (n+1)th row by the reset signal holding portion of the readout circuit 140. TX(n+1) is set at high level, thereby transferring the charges of the photoelectric converters 101 of the C pixels on the (n+1)th row to the FD portions 106. At this time, since TXD(n+1) remains at low level, the charges of the photoelectric converters 101 of the D pixels on the (n+1)th row are not transferred to the FD portions 106. That is, the D pixels accumulates charges continuously. S(n+1) is set at high level, thereby holding the image signal SV in the first wavelength range corresponding to a charge amount transferred to the FD portions 106 of the C pixels by the image signal holding portion of the readout circuit 140. At this time, the reset signal N corresponding to the reset level of the FD portions 106 of the D pixels is also held by the image signal holding portion of the readout circuit 140.

An operation in a horizontal scanning period HSCAN(n+1) on the (n+1)th row will now be described. In the horizontal scanning period HSCAN(n+1), PHST(n+1) is set at high level, thereby starting the scanning operation by the horizontal selecting circuit 150. Each time OUT(n+1) is set at high level, a plurality of columns on the (n+1)th row are selected sequentially, thereby outputting the pixels (the signals of the C pixels and the dummy signals of the D pixels) on the (n+1)th row sequentially via the output portion 170.

After that, the readout operations of the signals of the pixels on the (n+2)th row and the (n+3)th row are performed according to the above-described examples of the nth row and the (n+1)th row.

The readout operation of the image frame in the second wavelength range in the second period P2 will exemplarily be described with reference to FIG. 4B. FIG. 4B illustrates the timings of the readout operations (a part of the readout operation of the image frame in the second wavelength range) on the nth row and the (n+1)th row in the second period P2. First, RES(n) is set at high level, thereby turning on the reset transistors 104 on the nth row, and resetting the FD portions 106 on the nth row. Next, RES(n) is set at low level, thereby turning off the reset transistors 104. SEL(n) is then set at high level, thereby turning on the selection transistors 105 to select the pixels on the nth row.

N(n) for controlling the readout circuit 140 is set at high level, thereby holding the reset signal N corresponding to the reset level of the FD portions 106 of the A and B pixels on the nth row by the reset signal holding portion of the readout circuit 140. In the readout operation of the image frame in the first wavelength range, TX(n) is set at high level after this. In the readout operation of the image frame in the second wavelength range, however, TX(n) is kept at low level. Therefore, the charges of the photoelectric converters 101 of the A and B pixels on the nth row are not transferred to the FD portions 106. S(n) for controlling the readout circuit 140 is set at high level, thereby holding the reset signal N corresponding to the reset level of the FD portions 106 of the A and B pixels by the image signal holding portion of the readout circuit 140.

The operation in the horizontal scanning period HSCAN(n) on the nth row will now be described. In the horizontal scanning period HSCAN(n), PHST(n) is set at high level, thereby starting the scanning operation by the horizontal selecting circuit 150. Each time OUT(n) is set at high level, the plurality of columns on the nth row are selected sequentially, thereby outputting the dummy signals of the pixels (A and B pixels) on the nth row sequentially via the output portion 170.

The operation in the horizontal blank period HBLNK(n+1) on the (n+1)th row will now be described. First, RES(n+1) is set at high level, thereby turning on the reset transistors 104 on the (n+1)th row, and resetting the respective FD portions 106 of the D and C pixels on the (n+1)th row. Next, RES(n+1) is set at low level, thereby turning off the reset transistors 104. SEL(n+1) is then set at high level, thereby turning on the selection transistors 105 to select the D and C pixels on the (n+1)th row.

N(n+1) is set at high level, thereby holding the reset signal N corresponding to the reset level of the FD portions 106 of the D and C pixels on the (n+1)th row by the reset signal holding portion of the readout circuit 140. TXD(n+1) is set at high level, thereby transferring the charges of the photoelectric converters 101 of the D pixels on the (n+1)th row to the FD portions 106. At this time, since TX(n+1) remains at low level, the charges of the photoelectric converters 101 of the C pixels on the (n+1)th row are not transferred to the FD portions 106. S(n+1) is set at high level, thereby holding an image signal SI in the first wavelength range corresponding to a charge amount transferred to the FD portions 106 of the D pixels by the image signal holding portion of the readout circuit 140. At this time, the reset signal N corresponding to the reset level of the FD portions 106 of the C pixels is also held by the image signal holding portion of the readout circuit 140.

An operation in a horizontal scanning period HSCAN(n+1) on the (n+1)th row will now be described. In the horizontal scanning period HSCAN(n+1), PHST(n+1) is set at high level, thereby starting the scanning operation by the horizontal selecting circuit 150. Each time OUT(n+1) is set at high level, the plurality of columns on the (n+1)th row are selected sequentially, thereby outputting the pixels (the dummy signals of the C pixels and the signals of the D pixels) on the (n+1)th row sequentially via the output portion 170. The output portion 170 may be formed to output a signal obtained by amplifying a difference between the image signal SI and the reset signal N in the second wavelength range (SI-N) or a signal obtained by amplifying the image signal SI and the reset signal N in the second wavelength range. Alternatively, the readout circuit 140 can be formed to supply the difference between the image signal SI and the reset signal N in the second wavelength range (SI-N) to the output portion 170.

After that, the readout operations of the signals of the pixels on the (n+2)th row and the (n+3)th row are performed according to the above-described examples of the nth row and the (n+1)th row.

Subsequently, as shown in FIG. 3, the vertical selecting circuit 120 resets the photoelectric converters 101 of all pixels (A, B, C, and D pixels) under the rolling shutter scheme.

In the above example, in addition to the signals of the second pixels (D pixels), the dummy signals of the first pixels (A, B, and C pixels) are read out in the readout operation of the image frame in the second wavelength range. However, only the signals of the second pixels may be read out. Also, in the readout operation of the image frame in the first wavelength range, only the signals of the first pixels may be read out.

In the first embodiment, the number of second pixels (D pixels) is smaller than that of first pixels (A, B, and C pixels). It is possible to improve the resolution of an image in the second wavelength formed by the output of the second pixels using the output of the first pixels (for example, luminance information of the B pixels). The ratio of the number of first pixels and that of second pixels can be determined according to application purposes. At least two signals of the second pixels may be added and output. This makes it possible to improve the S/N ratio or the sensitivity of the second pixels.

As described above, in this embodiment, the transfer control lines of the first pixels and the transfer control lines of the second pixels are provided independently. This arrangement makes it possible to control the charge accumulation periods of the first pixels and the second pixels independently while increasing the area of the photoelectric converters. It is, therefore, possible to improve the sensitivity to the light in the second wavelength range. When the first pixels and the second pixels are controlled to make the charge accumulation period of the second pixels shorter than that of the first pixels as the modification of this embodiment, it is possible to improve the sensitivity of the light in the first wavelength range. Thus, the arrangement of this example can detect the light in the respective wavelength ranges satisfactorily.

(Second Embodiment)

Figure 5:
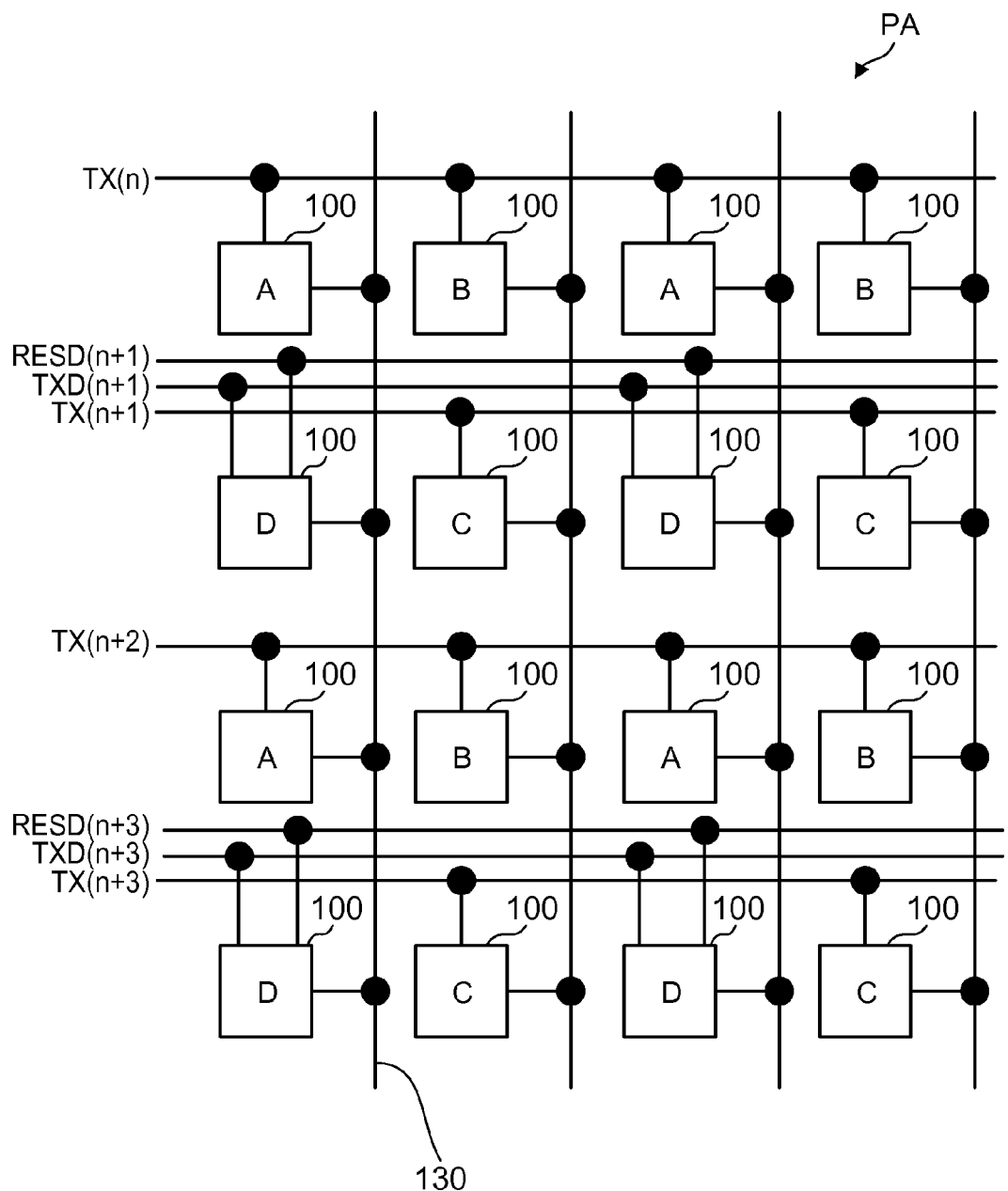
FIG. 5 is a view showing the arrangement of the pixel array of a solid-state image sensor according to the second embodiment.
Figure 6:
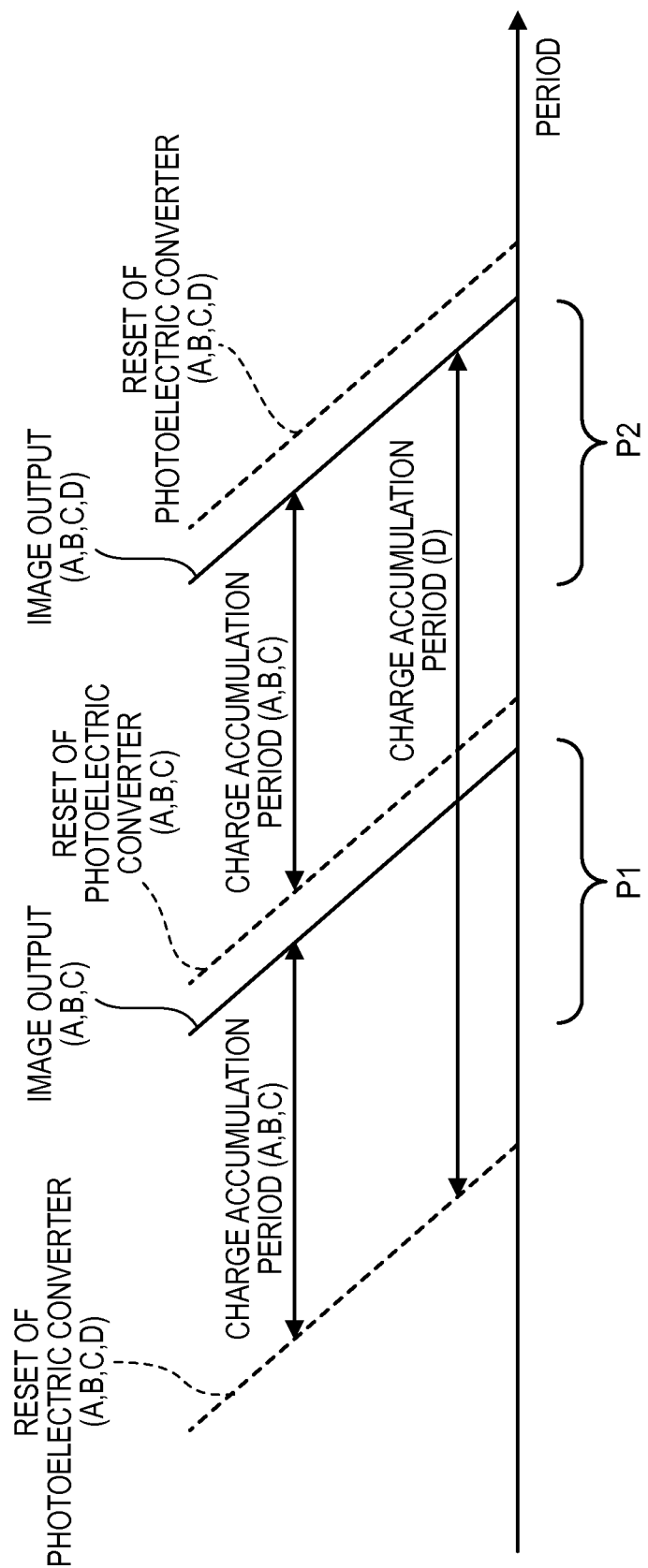
FIG. 6 is a timing chart showing a readout sequence in the solid-state image sensor according to the second embodiment.

A solid-state image sensor 1000 according to the second embodiment of the present invention will be described with reference to FIGS. 5 and 6. Note that details not mentioned in the second embodiment can conform to the first embodiment. In the second embodiment, the solid-state image sensor 1000 outputs an image formed by the signals of first pixels (A, B, and C pixels) (an image frame in the first wavelength range) in a first period P1 (an "image output (A, B, C)" in FIG. 6). The solid-state image sensor 1000 also outputs an image formed by the signals of the first pixels (A, B, and C pixels) and the signals of second pixels (D pixels) (an image frame in the first and the second wavelength ranges) in a second period P2 which is different from the first period P1 (an "image output (A, B, C, D)" in FIG. 6).

The solid-state image sensor 1000 according to the second embodiment includes transfer control lines TXD(n+1) and TXD(n+3) used for the second pixels (D pixels) in addition to transfer control lines TX(n), TX(n+1), TX(n+2), and TX(n+3) used for the first pixels (A, B, and C pixels). The transfer control lines TX(n), TX(n+1), TX(n+2), and TX(n+3) and the transfer control lines TXD(n+1) and TXD(n+3) are controlled independently. The solid-state image sensor 1000 according to the second embodiment also includes reset control lines RESD(n+1) and RESD(n+3) used for the second pixels besides reset control lines (not shown) RES(n), RES(n+1), RES(n+2), and RES(n+3) used for the first pixels. The reset control lines RES(n), RES(n+1), RES(n+2), and RES(n+3) and the reset control lines RESD(n+1) and RESD(n+3) are controlled independently.

This makes it possible to reset photoelectric converters 101 of the first pixels on a row which has undergone a signal readout operation and restart charge accumulation while outputting the image formed by the signals of the first pixels (A, B, and C pixels) (the image frame in the first wavelength range). Therefore, the image formed by the signals of the first pixels (A, B, and C pixels) and the signals of the second pixels (D pixels) (the image frame in the first and the second wavelength ranges) can be output (the "image output (A, B, C, D)" in FIG. 6) in the second period P2. In an example shown in FIG. 6, the frame rate of a frame including the image in the first wavelength range is twice as high as that in the second wavelength range. An accumulation period for the image in the first wavelength range read out in the period P1 and that in the second period P2 can typically be equal to each other.

(Third Embodiment)

Figure 7:
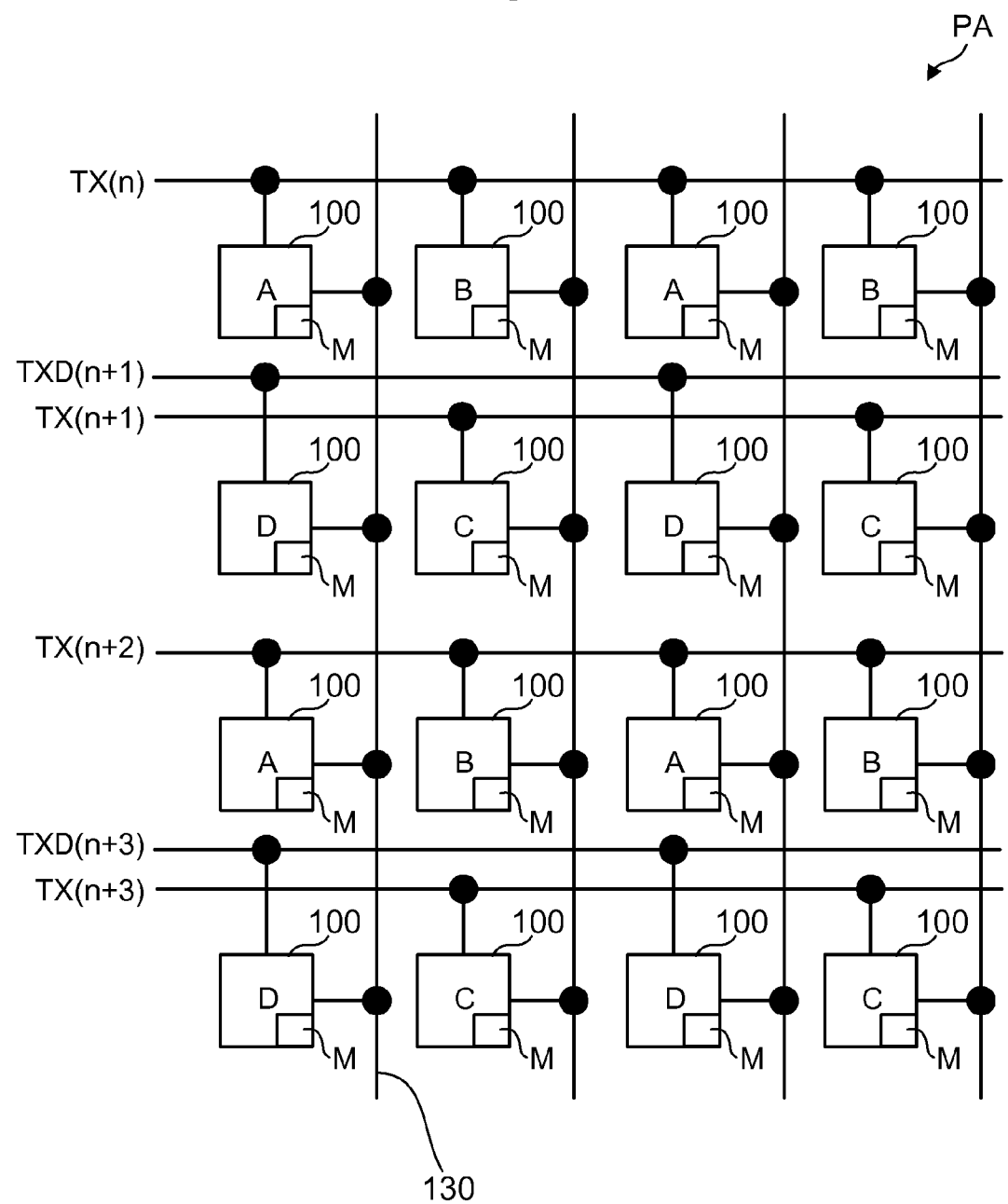
FIG. 7 is a view showing the arrangement of the pixel array of a solid-state image sensor according to the third embodiment.

A solid-state image sensor 1000 according to the third embodiment of the present invention will be described with reference to FIGS. 7 and 8. Note that details not mentioned in the third embodiment can conform to the first embodiment. The solid-state image sensor 1000 according to the third embodiment includes transfer control lines TXD(n+1) and TXD(n+3) used for second pixels (D pixels) in addition to transfer control lines TX(n), TX(n+1), TX(n+2), and TX(n+3) used for first pixels (A, B, and C pixels). Also, in the solid-state image sensor 1000 according to the third embodiment, each pixel 100 includes a memory portion M. This arrangement makes it possible to read out an image in the first wavelength range and an image in the second wavelength range having different charge accumulation periods in the same frame.

Figure 8:
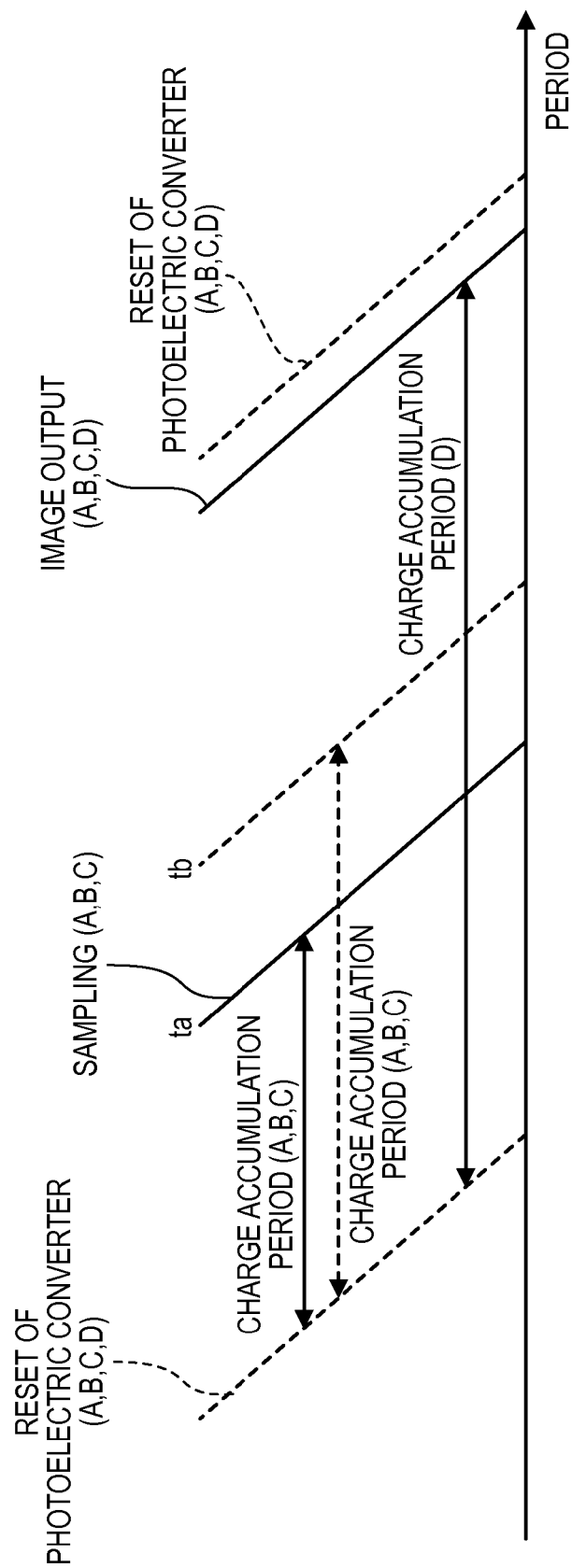
FIG. 8 is a timing chart showing a readout sequence in the solid-state image sensor according to the third embodiment.

As illustrated in FIG. 8, in a charge accumulation period in photoelectric converters 101 of the second pixels (D pixels) (indicated as a "charge accumulation period (D)" in FIG. 8), after the completion of charge accumulation in the photoelectric converters 101 of the first pixels (A, B, and C pixels), charges accumulated in the photoelectric converters 101 can be transferred to and stored in the memory portions M (indicated as a "sampling (A, B, C)" in FIG. 8). At this time, charges in the photoelectric converters 101 of the second pixels (D pixels) are not transferred to the memory portions M. The charge accumulation period in the photoelectric converters 101 of the second pixels (D pixels) ends upon charge transfer to the memory portions M. In the third embodiment, the frame rate of the image in the first wavelength range and that in the second wavelength range become equal to each other.

In FIG. 8, charge transfer from the photoelectric converters 101 of the first pixels (A, B, and C pixels) to the memory portions M starts at ta. However, it may be changed to start at an arbitrary tb. This makes it possible to change the ratio of the charge accumulation period of the second pixels (D pixels) and that of the first pixels (A, B, and C pixels). From another point of view, alternatively, it is possible to control the charge accumulation period of the first pixels (A, B, and C pixels) and that of the second pixels (D pixels) independently.

The memory portions M may be formed by FD portions 106. In this case, the readout operation of a reset signal corresponding to a reset level can be performed immediately after the readout operation of an image signal SV in the first wavelength range and an image signal SI in the second wavelength range.

Each memory portion M may be formed by a capacitive element and a switch. Each memory portion M can be formed by, for example, connecting one terminal of the capacitive element between the photoelectric converter 101 and a transfer transistor 102, and connecting the other terminal of the capacitive element to a fixed potential such as a ground potential. A simultaneous exposure operation can also be performed by providing the memory portions M in the pixels 100. In this case, it is preferable to provide the memory portion for the reset signal and those for the image signals in the pixels 100.

Figure 9:
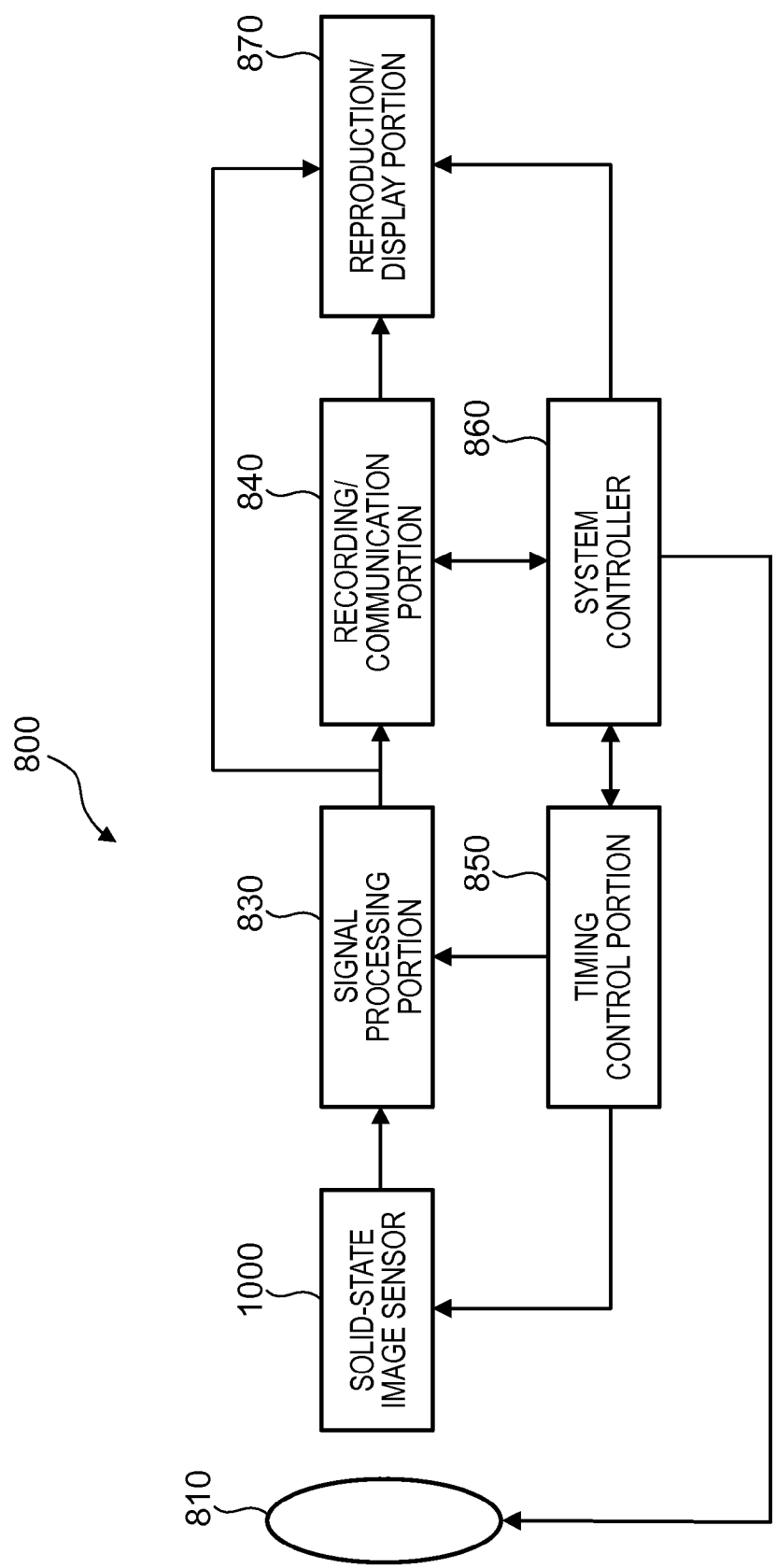
FIG. 9 is a block diagram showing the arrangement of a camera according to one embodiment.

An image sensing system 800 according to one embodiment of the present invention will be described below with reference to FIG. 9. The concept of the image sensing system includes an apparatus such as a camera whose main purpose is image capturing. The concept of the image sensing system also includes not only the apparatus whose main purpose is image capturing, but also an apparatus (for example, a personal computer or a portable terminal) having an image capturing function as an auxiliary function. The image sensing system includes the solid-state image sensor according to the present invention exemplified as the above-mentioned embodiments, and a processing portion that processes a signal (image) output from the solid-state image sensor. This processing portion can include, for example, an A/D converter, and a processor that processes digital data output from the A/D converter. Alternatively, the image sensing system includes the solid-state image sensor according to the present invention exemplified as the above-mentioned embodiments, and a display portion that displays the signal (image) output from the solid-state image sensor.

The image sensing system 800 includes, for example, an optical system 810, the solid-state image sensor 1000, a signal processing portion 830, a recording/communication portion 840, a timing control portion 850, a system controller 860, and a reproduction/display portion 870. The optical system 810 forms an image of an object on the pixel array of the solid-state image sensor 1000. The solid-state image sensor 1000 outputs an image by performing imaging operation based on a signal from the timing control portion 850. The image output from the solid-state image sensor 1000 is provided to the signal processing portion 830.

The signal processing portion 830 processes the image in the first wavelength range and the image in the second wavelength range provided by the solid-state image sensor 1000, and provides the resultant data to the recording/communication portion 840. If the resolution of the image in the second wavelength range is insufficient, the signal processing portion 830 can improve the resolution of the image in the second wavelength range using the image in the first wavelength range.

The recording/communication portion 840 sends an image to the reproduction/display portion 870 to cause it to reproduce and display the image. The recording/communication portion 840 also records the image in a recording medium (not shown).

The timing control portion 850 controls the driving timings of the solid-state image sensor 1000 and the signal processing portion 830 under the control of the system controller 860. The system controller 860 comprehensively controls the operation of the image sensing system 800, and controls driving of the optical system 810, the timing control portion 850, the recording/communication portion 840, and the reproduction/display portion 870. The system controller 860 includes, for example, a storage device (not shown), and records programs required to control the operation of an image sensing system and the like in the storage device. In addition, the system controller 860 sets a mode in accordance with, for example, an operation by the user.

The settable modes can include a mode of, for example, outputting the image in the second wavelength range formed only by the signals of the second pixels (D pixels) from the solid-state image sensor 1000. The settable modes can also include a mode of outputting the dummy signals of the first pixels (A, B, and C pixels) and an image including the signals of the second pixels (D pixels) from the solid-state image sensor 1000. The selectable modes can also include a mode in which the image in the first wavelength range and the image in the second wavelength range are synthesized, and displayed by the reproduction/display portion. By synthesizing the image in the first wavelength range and the image in the second wavelength range, they can be superimposed on each other and displayed. The selectable modes can further include a mode in which the reproduction/display portion individually displays the image in the first wavelength range and the image in the second wavelength range.

The signal processing portion included in the image sensing system can generate a display signal for performing display by light in the first wavelength range based on the signals of the D pixels output from the solid-state image sensor 1000. The display portion included in the image sensing system can perform the display by the light in the first wavelength range based on the signals of the D pixels output from the solid-state image sensor 1000.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-234310, filed Nov. 12, 2013, which is hereby incorporated by reference herein in its entirety.

What is claimed is:
1. A solid-state image sensor comprising:
a plurality of pixels arranged to form a matrix, the pixels including at least a first pixel configured to detect light in a first wavelength range and a second pixel configured to detect light in a second wavelength range, the second wavelength range including a wavelength range on a longer-wavelength side than the first wavelength range,
wherein each of the first pixel and the second pixel includes a photoelectric converter, a floating diffusion portion, a transfer transistor configured to transfer charges from the photoelectric converter to the floating diffusion portion, an amplifier transistor configured to output a signal corresponding to a potential of the floating diffusion portion, and a memory portion, and the first pixel and the second pixel belong to a same row,
a first transfer control line configured to control the transfer transistor of the first pixel and a second transfer control line configured to control the transfer transistor of the second pixel are provided independently,
the solid-state image sensor further comprises a control portion configured to supply a control signal to the transfer transistor such that a charge accumulation period of the first pixel is different from a charge accumulation period of the second pixel, and an output portion configured to output an image signal including a signal of the first pixel and a signal of the second pixel,
wherein the control portion controls the first pixel and the second pixel to hold the signal of the first pixel in the memory portion of the first pixel until charge accumulation in the second pixel is finished, and the output portion outputs the image signal including the signal of the first pixel and the signal of the second pixel after the charge accumulation in the second pixel is finished.

2. The sensor according to claim 1, wherein the control portion controls the charge accumulation periods of the first pixel and the second pixel such that the charge accumulation period of the second pixel is longer than the charge accumulation period of the first pixel.

3. The sensor according to claim 2, wherein a part of the charge accumulation period of the second pixel overlaps the accumulation period of the first pixel.

4. The sensor according to claim 1, wherein each of the first pixel and the second pixel further includes a reset transistor configured to reset the potential of the floating diffusion portion.

5. The sensor according to claim 4, wherein a reset control line configured to control the reset transistor of the first pixel and a reset control line configured to control the reset transistor of the second pixel are common.

6. The sensor according to claim 4, wherein a reset control line configured to control the reset transistor of the first pixel and a reset control line configured to control the reset transistor of the second pixel are provided independently.

7. The sensor according to claim 1, wherein each of the first pixel and the second pixel further includes a selection transistor, and
a selecting control line configured to control the selection transistor of the first pixel and a selecting control line configured to control the selection transistor of the second pixel are common.

8. The sensor according to claim 1, further comprising:
a first output line to which the signal of the first pixel is read out; and
a second output line to which the signal of the second pixel is read out.

9. An image sensing system comprising:
a solid-state image sensor defined in claim 1; and
a processing portion configured to process a signal output from the solid-state image sensor.

10. The system according to claim 9, wherein the processing portion generates, based on a signal from the second pixel, a display signal for performing display using light in the same wavelength range as a wavelength range of light detected by the first pixel.

11. An image sensing system comprising:
a solid-state image sensor defined in claim 1; and
a display portion configured to perform display based on a signal output from the solid-state image sensor.

12. A system according to claim 11, wherein the display portion performs, based on a signal from the second pixel, display using light in the same wavelength range as a wavelength range of light detected by the first pixel.

13. The system according to claim 11, wherein the display portion superimposes and displays, based on a signal from the second pixel, an image based on a signal from the first pixel and an image obtained by using light in the same wavelength range as a wavelength range of light detected by the first pixel.

* * * * *